United States Patent
Guo et al.

(10) Patent No.: US 12,370,447 B2
(45) Date of Patent: Jul. 29, 2025

(54) GAME PLOT INTERACTION METHOD, APPARATUS, AND SYSTEM

(71) Applicant: SHANGHAI HODE INFORMATION TECHNOLOGY CO., LTD., Shanghai (CN)

(72) Inventors: Xinyue Guo, Shanghai (CN); Bin Wang, Shanghai (CN); Da Hua, Shanghai (CN); Cheng Qian, Shanghai (CN); Hongfei Yu, Shanghai (CN); Shun Li, Shanghai (CN); Jiadong Yang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 259 days.

(21) Appl. No.: 18/226,212

(22) Filed: Jul. 25, 2023

(65) Prior Publication Data

US 2024/0033626 A1 Feb. 1, 2024

(30) Foreign Application Priority Data

Jul. 26, 2022 (CN) .......................... 202210887269.0

(51) Int. Cl.
A63F 13/53 (2014.01)
A63F 13/85 (2014.01)

(52) U.S. Cl.
CPC .............. *A63F 13/53* (2014.09); *A63F 13/85* (2014.09)

(58) Field of Classification Search
CPC .................................. A63F 13/53; A63F 13/85
See application file for complete search history.

(56) References Cited

U.S. PATENT DOCUMENTS

2021/0352372 A1* 11/2021 Sun .................... H04N 21/4312
2023/0276102 A1* 8/2023 Chen ........................ G06T 7/70
725/34

* cited by examiner

*Primary Examiner* — Reginald A Renwick
(74) *Attorney, Agent, or Firm* — BakerHostetler

(57) ABSTRACT

This application provides techniques for implementing interactions in games. The techniques comprise in response to detecting that a client device associated with a player enters a plot stage of a target game, capturing a current game picture at intervals of a preset duration; obtaining a screen recording video corresponding to the target game from a video platform; determining a plot video frame that is in the screen recording video and that matches the current game picture; obtaining target bullet-screen comment information corresponding to the plot video frame from the video platform; and synchronously displaying target bullet screens in the current game picture on the client device, wherein the target bullet screens correspond to the target bullet-screen comment information.

20 Claims, 5 Drawing Sheets

GAME PLOT INTERACTION METHOD, APPARATUS, AND SYSTEM

CROSS-REFERENCE TO RELATED APPLICATION

The present application claims priority to Chinese Patent Application No. 202210887269.0, filed on Jul. 26, 2022, which is incorporated herein by reference in its entirety.

TECHNICAL FIELD

This application relates to the field of computer technologies, and in particular, to a game plot interaction method. This application also relates to a game plot interaction apparatus, a game plot interaction system, a computing device, and a computer-readable storage medium.

BACKGROUND

With the rapid development of computer technologies and Internet technologies, a variety of games emerge one after another, and gameplay of games is also varied. In addition to game functions such as game battle and card drawing, a game function of a plot type may be further provided in a game.

SUMMARY

In view of this, embodiments of this application provide a game plot interaction method. This application also relates to a game plot interaction apparatus, a game plot interaction system, a computing device, and a computer-readable storage medium, to resolve a technical problem that there is a delay in interaction, affecting interaction experience of a user for a game plot in the conventional technology.

According to a first aspect of the embodiments of this application, a game plot interaction method is provided, applied to a game client computing device and including:
when detecting that a first player enters a plot stage of a target game, obtaining a current game picture of the first player at intervals of preset duration;
obtaining a screen recording video corresponding to the target game, and determining a plot video frame that is in the screen recording video and that matches the current game picture; and
obtaining target bullet-screen comment information corresponding to the plot video frame from a video platform, and synchronously displaying the target bullet-screen comment information in the current game picture.

According to a second aspect of the embodiments of this application, a game plot interaction method is provided, applied to a video platform and including:
receiving a screen recording video that is of a target game and that is uploaded by a second player, and receiving bullet-screen comment content sent by a viewing user for the screen recording video;
receiving a bullet-screen comment obtaining request sent by a game client computing device, where the bullet-screen comment obtaining request carries a plot video frame, and the plot video frame is a video frame that is determined by the game client computing device and that matches a current game picture of a first player; and
obtaining target bullet-screen comment information corresponding to the plot video frame, and returning the target bullet-screen comment information to the game client computing device, where the target bullet-screen comment information is used to be synchronously displayed in the current game picture of the game client computing device.

According to a third aspect of the embodiments of this application, a game plot interaction apparatus is provided, applied to a game client computing device and including:
an obtaining means, configured to: when it is detected that a first player enters a plot stage of a target game, obtain a current game picture of the first player at intervals of preset duration;
a determining means, configured to obtain a screen recording video corresponding to the target game, and determine a plot video frame that is in the screen recording video and that matches the current game picture; and
a synchronization means, configured to obtain target bullet-screen comment information corresponding to the plot video frame from a video platform, and synchronously display the target bullet-screen comment information in the current game picture.

According to a fourth aspect of the embodiments of this application, a game plot interaction apparatus is provided, applied to a video platform and including:
a first receiving means, configured to receive a screen recording video that is of a target game and that is uploaded by a second player, and receive bullet-screen comment content sent by a viewing user for the screen recording video;
a second receiving means, configured to receive a bullet-screen comment obtaining request sent by a game client computing device, where the bullet-screen comment obtaining request carries a plot video frame, and the plot video frame is a video frame that is determined by the game client computing device and that matches a current game picture of a first player; and
a first return means, configured to obtain target bullet-screen comment information corresponding to the plot video frame, and return the target bullet-screen comment information to the game client computing device, where the target bullet-screen comment information is used to be synchronously displayed in the current game picture of the game client computing device.

According to a fifth aspect of the embodiments of this application, a game plot interaction system is provided. The system includes a video platform and a game client computing device.

The video platform is configured to receive a screen recording video that is of a target game and that is uploaded by a second player, and receive bullet-screen comment content sent by a viewing user for the screen recording video; receive a bullet-screen comment obtaining request sent by the game client computing device, where the bullet-screen comment obtaining request carries a plot video frame, and the plot video frame is a video frame that is determined by the game client computing device and that matches a current game picture of a first player; and obtain target bullet-screen comment information corresponding to the plot video frame, and return the target bullet-screen comment information to the game client computing device, where the target bullet-screen comment information is used to be synchronously displayed in the current game picture of the game client computing device.

The game client computing device is configured to: when detecting that the first player enters a plot stage of the target game, obtain the current game picture of the first player at intervals of preset duration; obtain the screen recording video corresponding to the target game, and determine the plot video frame that is in the screen recording video and that matches the current game picture; and obtain the target bullet-screen comment information corresponding to the plot video frame from the video platform, and synchronously display the target bullet-screen comment information in the current game picture.

According to a sixth aspect of the embodiments of this application, a computing device is provided, including:

a memory and a processor.

The memory is configured to store computer executable instructions, and the processor is configured to execute the computer executable instructions to implement the steps of the foregoing game plot interaction method.

According to a seventh aspect of the embodiments of this application, a computer-readable storage medium is provided. The computer-readable storage medium stores computer executable instructions, and the steps of the foregoing game plot interaction method are implemented when the computer executable instructions are executed by a processor.

According to the game plot interaction method provided in the embodiments of this application, when detecting that the first player enters the plot stage of the target game, the game client computing device may obtain the current game picture of the first player at intervals of the preset duration; obtain the screen recording video corresponding to the target game, and determine the plot video frame that is in the screen recording video and that matches the current game picture; and obtain the target bullet-screen comment information corresponding to the plot video frame from the video platform, and synchronously display the target bullet-screen comment information in the current game picture.

In this case, when the first player plays the game in the game client computing device, if the game client computing device detects that the first player enters the plot stage of the target game, the game client computing device may obtain the current game picture of the first player at intervals of the preset duration; then determine, in the screen recording video corresponding to the target game, the plot video frame corresponding to the current game picture, where the plot video frame may represent corresponding current plot progress of the first player in the screen recording video; and then synchronize bullet-screen comments sent by other users for the plot video frame in the video platform to the current game picture in the game client computing device for display, that is, synchronize bullet-screen comment information corresponding to the current plot progress to a corresponding game progress picture in the game client computing device for display.

In this way, bullet-screen comment synchronization can be performed on current game progress of the first player through game plot matching between the game client computing device and the video platform, to transfer and share a bullet-screen comment of corresponding progress in the screen recording video to a current game interface in the game client computing device without any barriers. Therefore, when playing the game in the game client computing device, the first player can view, in a timely manner, a bullet-screen comment sent by another user, to improve interaction timeliness, thereby improving interaction experience of a user for a game plot.

DESCRIPTION OF EMBODIMENTS

Figure 1:
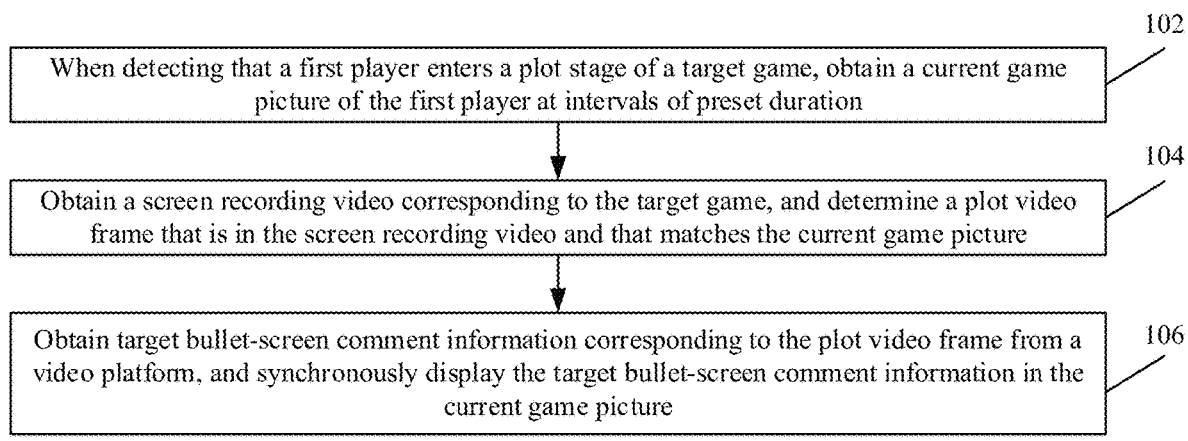
FIG. 1 is a flowchart of a game plot interaction method according to an embodiment of this application.

Many specific details are described in the following description to facilitate full understanding of this application. However, this application can be implemented in many other manners different from those described herein, and a person skilled in the art can make similar promotion without departing from the connotation of this application. Therefore, this application is not limited by specific implementations disclosed below.

Terms used in one or more embodiments of this application are merely for the purpose of describing a specific embodiment, and are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to distinguish between information of the same type. For example, without departing from the scope of one or more embodiments of this application, "first" may also be referred to as "second", and similarly, "second" may also be referred to as "first". Depending on the context, for example, the word "if" used herein can be interpreted as "while", "when", or "in response to determining".

Terms used in one or more embodiments of this application are explained first.

Tag-on: Tag-on herein corresponds to "embed". "Embed" indicates a system built in a game. Tag-on indicates a software function that is from software externally enabled at the same time as a game client computing device and that is displayed in the game client computing device in a floating form, a hanging form, or the like.

Game plot: The game plot herein is a linearly performed pure game plot that includes a plot text, a computer animation (CG), a cutscene, and background music (BGM) and excludes other game functions such as game battle and card drawing and that is preset by a producer. The cutscene is a part of a game. During the cutscene, a player cannot actively control game progress (or has only little control permission). The cutscene is often used to interrupt a current game, to develop a storyline, display role development, or provide background information, an environment atmosphere, a dialogue, and a clue. The cutscene may be in a form of an animation, or may be an actual movie picture.

A speeded-up robust features (SURF) algorithm: The SURF algorithm is a robust image recognition and description algorithm, and the algorithm may be used in computer vision tasks, such as object recognition and 3D reconstruction. On the basis of maintaining an excellent performance characteristic of a scale-invariant feature transform (SIFT) algorithm, the algorithm resolves both disadvantages of high computing complexity and long consumed time of SIFT, improves point-of-interest extraction and feature vector description thereof, and increases a computing speed. In the embodiments of this application, the algorithm may be used for position recognition calculation of an object that can trigger an advancement event in a video frame and position recognition calculation of an object that can trigger an advancement event in a current game picture.

Optical character recognition (OCR): An optical technology and a computer technology are used to read text printed on or written on a paper and convert the text into a format that can be accepted by a computer and can be understood by a person. In the embodiments of this application, OCR may be used to extract bullet-screen comment content in a video.

It should be noted that currently, to perform game plot interaction with other players, users mostly upload game plot parts to a video platform in a screen recording form, and the other players perform plot interaction with the uploading user in the video platform in a bullet-screen comment or comment manner. There is a delay in the interaction. In addition, due to a risk of spoilers, this type of screen recording video has been resisted by some game manufacturers and therefore an agreement is signed with the video platform to prohibit a screen recording video of a game plot from being uploaded.

In a current game bullet-screen comment embedding technology, a platform to which a comment can be input is provided for a player in a specific game plot in a client game computing device. Bullet screens comprise user comments on content and the bullet screens move across display screen (e.g., from right to left, left to right, top to bottom, or bottom to top) over the content (e.g., video frames).

After sensitive entries are filtered out from a database of the platform after specific time, comment content input by the player is randomly extracted and is presented in the game plot in the game client computing device. Due to a little bullet-screen comment content, a high repetition degree, and a lack of a good interaction atmosphere, after the player inputs a comment, the bullet-screen comment cannot be displayed in the game plot in real time, causing a lack of positive feedback. In addition, currently, the technology can be implemented only in an automatically played animation plot, causing a large limitation on a use scenario.

In the embodiments of this application, a game plot interaction method may be provided. A game client computing device is connected to an interface of a video platform to recognize plot browsing behavior and browsing progress, such as automatic play and clicking on a next sentence, of a player in the game client computing device. In addition, a video uploading template is provided for the connected video platform. When the player performs screen recording on a plot and uploads a screen recording video to the video platform, touch behavior and a text change within a specific range in a game picture may be recognized to determine play progress in the screen recording video, to synchronize plot game progress in the game client computing device with the video play progress in the video platform. When a user leaves a bullet-screen comment in the uploaded video, the game player may voluntarily choose, when browsing a plot in the game client computing device, whether to synchronically tag on the bullet-screen comment in the video platform to the game client computing device. In addition, plot progress of the player in the game client computing device may be recorded in the video platform. When the video platform determines that the player has unlocked a plot, a corresponding plot video uploaded to the video platform is open to the player, thereby providing a game plot interaction platform, and also avoiding a risk of game plot spoiler caused by uploading of a screen recording video.

In the embodiments of this application, through game plot matching between the game client computing device and the video platform, a bullet-screen comment of the video platform may be synchronously displayed in the game client computing device in a floating state in a tag-on manner by using a behavior node of a plot browsing operation as a reference. Through game plot matching between the game client computing device and the video platform, the player can be helped to transfer and share a bullet-screen comment in screen recording video content to a game interface of the game client computing device without any barriers. In addition, a player having started this plot in the game can be provided with screen recording viewing and bullet-screen comment communication permission in the video platform, to effectively avoid spoilers.

This application provides a game plot interaction method. This application also relates to a game plot interaction apparatus, a game plot interaction system, a computing device, and a computer-readable storage medium. The game plot interaction method, the game plot interaction apparatus, the game plot interaction system, the computing device, and the computer-readable storage medium are described in detail one by one in the following embodiments.

FIG. 1 is a flowchart of a game plot interaction method according to an embodiment of this application. The method is applied to a game client computing device and specifically includes the following steps.

Step 102: When detecting that a first player enters a plot stage of a target game, obtain a current game picture of the first player at intervals of preset duration.

Specifically, the first player is a player currently playing the target game in the game client computing device. The target game is a currently operated game. The plot stage is a pure game plot stage in the target game. The preset duration is preset duration of an interval at which a game picture screenshot is captured, namely, frequency at which a game picture screenshot is captured.

It should be noted that, a screenshot of the current game picture of the game client computing device may be captured at intervals of the preset duration to obtain a current game picture within current preset duration. For example, the game client computing device captures the screenshot of the game picture of the game client computing device at intervals of S seconds to obtain a current game picture P. Certainly, in actual application, the current game picture of the first player may be obtained in another manner. For example, the current game picture of the first player may be obtained, based on a process identifier of a current plot process of the target game, from game data that is of the target game and that is stored in the game client computing device. A specific manner of obtaining the current game picture of the first player is not limited in this application.

In this embodiment of this application, when it is detected that the first player enters the plot stage of the target game, the current game picture of the first player may be obtained at intervals of the preset duration, to facilitate matching subsequently performed against corresponding game progress in a screen recording video of the target game based on the current game picture, to synchronize a bullet-screen comment of the corresponding progress to the current game picture of the game client computing device for display.

Step 104: Obtain a screen recording video corresponding to the target game, and determine a plot video frame that is in the screen recording video and that matches the current game picture.

It should be noted that another player may have operated the target game and unlocked a corresponding game plot. Therefore, the another player may perform screen recording on the target game and upload an obtained screen recording video to a video platform, so that each viewing user having viewing permission can publish a bullet-screen comment for the screen recording video. Therefore, to synchronize a bullet-screen comment in the video platform to the game client computing device, current game progress in the game client computing device needs to be first matched against game progress in the video platform. Specifically, the screen recording video corresponding to the target game may be first obtained, and then the plot video frame that is in the screen recording video and that matches the current game picture may be determined. The plot video frame may represent corresponding current plot progress of the first player in the screen recording video.

The video platform is a server computing device including a screen recording video related to a game plot. The server computing device may collect bullet-screen comment data of video playback client computing devices, and send the bullet-screen comment data to a game server computing device. The bullet-screen comment data is finally displayed in a game client computing device of a game player.

In actual application, the screen recording video corresponding to the target game may be obtained from a server computing device storing the screen recording video. Alternatively, after obtaining a screen recording video by performing screen recording on the target game, a player may upload the screen recording video to the video platform for other users to view, and therefore the screen recording video corresponding to the target game may be obtained from the video platform.

In an optional implementation of this embodiment, the plot video frame that is in the screen recording video and that matches the current game picture may be determined in a page matching manner, that is, the plot video frame that is in the screen recording video and that matches the current game picture may be determined in the following specific implementation process:

determining at least one progress key frame that is in the screen recording video and in which a first plot advancement mark exists;
 matching the current game picture against the at least one progress key frame to determine a matching key frame corresponding to the current game picture; and
 determining, based on the matching key frame, the plot video frame that is in the screen recording video and that matches the current game picture.

It should be noted that, the target game may further include other game stages such as battle and card drawing in addition to a game plot. Therefore, the screen recording video of the target game further includes video frames other than video frames corresponding to the game plot. In addition, some of the video frames corresponding to the game plot are automatically played video frames, do not need to be operated by a user, and do not advance plot progress. Usually, no interactive bullet-screen comments exist in the video frames. Therefore, a video frame that can advance game plot progress, namely, the progress key frame, may be determined from the screen recording video.

In actual application, after obtaining a screen recording video of the target game by performing screen recording on the target game, a player may further mark the screen recording video, to mark a video frame that is in the screen recording video and that can advance game plot progress. Specifically, the first plot advancement mark may be set for the video frame that is in the screen recording video of the target game and that can advance game plot progress.

Therefore, video frames included in the screen recording video of the target game may be searched to determine the at least one progress key frame in which the first plot advancement mark exists. The progress key frame is a video frame that is in the screen recording video of the target game and that can advance game plot progress. Then, the current game picture may be matched against the at least one progress key frame to determine the matching key frame corresponding to the current game picture, that is, a specific key frame that is in the at least one progress key frame and that matches the current game picture may be determined, and then the plot video frame that is in the screen recording video and that matches the current game picture may be determined based on the matching key frame. The plot video frame may represent corresponding plot progress of the current game picture in the screen recording video of the target game.

In actual application, when the current game picture is matched against the at least one progress key frame to determine the matching key frame corresponding to the current game picture, first, a picture feature vector Tu of the current game picture may be extracted, and frame feature vectors Tv of progress key frames may be determined; and then, vector distances (such as Euclidean distances) between the picture feature vector Tu and the frame feature vectors Tv of the progress key frames may be calculated one by one. When the vector distance is less than a first distance threshold, it indicates that a distance between the picture feature vector Tu and a frame feature vector Tv of a corresponding progress key frame is relatively short, and the progress key frame may be located in same game plot progress as the current game picture. Therefore, a target vector distance less than the first distance threshold may be determined from the vector distances, and a progress key frame corresponding to the target vector distance may be used as the matching key frame.

In addition, after the matching key frame is determined by performing matching based on the picture feature vector Tu of the current game picture and the frame feature vectors Tv of the progress key frames, the matching key frame may be directly used as the plot video frame that can represent game plot progress of the current game picture. Alternatively, it is checked, in a check manner, whether the matching key frame obtained through matching is accurate, to determine the plot video frame that can represent game plot progress of the current game picture.

In this embodiment of this application, the at least one progress key frame that is in the screen recording video and in which the first plot advancement mark exists may be first determined, then the current game picture may be matched against the at least one progress key frame to determine the matching key frame corresponding to the current game picture, and then the plot video frame that is in the screen recording video and that matches the current game picture may be determined based on the matching key frame. The plot video frame may represent the corresponding game plot process of the current game picture in the screen recording video of the target game, to facilitate subsequent synchronization of a bullet-screen comment of the corresponding game plot progress in the video platform to the game client computing device, thereby improving interaction timeliness.

In an optional implementation of this embodiment, it may be monitored whether an advancement event occurs in a plot advancement region in the current game picture, to check whether the matching key frame obtained through matching is accurate, that is, the plot video frame that is in the screen recording video and that matches the current game picture may be determined based on the matching key frame in the following specific implementation process:

recognizing and monitoring a plot advancement region in the current game picture; and when monitoring that an advancement event occurs in the plot advancement region, using the matching key frame as the plot video frame matching the current game picture.

Specifically, the plot advancement region may be a region in which an advancement event can be triggered to trigger game plot progress. For example, the plot advancement region may include a position of an OK button and a plot text region, and the user may trigger an advancement event by clicking on either the OK button or the plot text region, to advance game plot progress.

It should be noted that when the matching key frame is determined by performing matching based on the picture feature vector of the current game picture and the frame feature vectors of the progress key frames, only rough matching is performed by using the vector distances. Therefore, the plot advancement region in the current game picture may be further recognized and monitored. When it is monitored that an advancement event occurs in the plot advancement region, it indicates that the user triggers the advancement event in the current game picture, the current game picture is a game picture that can advance game plot progress, and a corresponding plot chapter is unlocked. In this case, it may be determined that the matching key frame is the plot video frame matching the current game picture, that is, the matching key frame may represent corresponding game plot progress of the current game picture in the screen recording video of the target game.

In addition, if it is not monitored that an advancement event occurs in the plot advancement region, it indicates that the player does not perform an operation in the current game picture, and the current game picture cannot advance game plot progress. However, the determined matching key frame is a video frame that is in the screen recording video and that can advance game plot progress. Therefore, a matching error may occur, and a next game picture may continue to be matched until a plot video frame corresponding to a game picture that can advance game plot progress is determined.

In actual application, when the plot advancement region in the current game picture is recognized, a target object in the current game picture may be recognized by using an object video recognition algorithm. The target object is an object that can trigger an advancement event, such as an OK button or a plot text box. For example, the current game picture may be recognized by using a SURF algorithm, to determine a position Po of an OK button and a region Re of a plot text box in the current game picture, and monitor whether an advancement event occurs in the position Po and the region Re.

In this embodiment of this application, after the matching key frame corresponding to the current game picture is determined by matching the current game picture against the at least one progress key frame, it may be monitored whether an advancement event occurs in the plot advancement region in the current game picture, to check whether the matching key frame obtained through matching for the current game picture is accurate, thereby improving accuracy of game plot progress matching. Touch behavior and a text change within a specific range in the current game picture are recognized to determine play progress in the screen recording video, to synchronize plot game progress in the game client computing device with video play progress in the video platform.

In an optional implementation of this embodiment, game plot progress unlocked by the first player in the game client computing device may be further synchronized to the video platform, to update video viewing permission of the player, that is, after the plot video frame that is in the screen recording video and that matches the current game picture is determined, the method may further include:

determining a target plot chapter corresponding to the plot video frame based on a correspondence between video frames and plot chapters; and sending a video permission unlocking instruction of the first player to the video platform, where the video permission unlocking instruction carries player information of the first player and the target plot chapter.

It should be noted that when the plot video frame that is in the screen recording video and that matches the current game picture is determined, it indicates that the first player has unlocked game plot progress corresponding to the plot video frame in the game client computing device, and the first player can have permission to view video content in front of the plot video frame in the video platform. Therefore, the target plot chapter corresponding to the plot video frame may be determined based on the correspondence between video frames and plot chapters, and the video permission unlocking instruction of the first player may be sent to the video platform, where the video permission unlocking instruction carries the player information of the first player and the target plot chapter, to indicate the video platform to update video permission information of the first player, so that subsequently the video platform can determine, based on permission information, whether a viewing requesting user has viewing permission, thereby avoiding game plot spoilers.

In this embodiment of this application, the game client computing device may be connected to an interface of the video platform to recognize plot browsing behavior and browsing progress, such as automatic play and clicking on a next sentence, of the player in the game client computing device. Touch behavior and a text change within a specific range in the game picture are recognized to determine play progress in the screen recording video, to synchronize plot game progress in the game client computing device with video play progress in the video platform. Plot progress of the player in the game client computing device may be recorded in the video platform. When the video platform determines that the player has unlocked a plot, a corresponding plot video uploaded to the video platform is open to the player, thereby providing a game plot interaction platform, and also avoiding a risk of game plot spoilers caused by uploading of a screen recording video.

Step 106: Obtain target bullet-screen comment information corresponding to the plot video frame from the video platform, and synchronously display the target bullet-screen comment information in the current game picture.

It should be noted that the determining a plot video frame that is in the screen recording video and that matches the current game picture is synchronizing game plot process in the game client computing device with play progress of the screen recording video in the video platform. In this case, the target bullet-screen comment information corresponding to the plot video frame may be obtained from the video platform, and the target bullet-screen comment information may be synchronously displayed in the current game picture.

In actual application, when another viewing user leaves a bullet-screen comment in the screen recording video of the target game, when browsing a plot in the game client computing device to perform the target game, the first player may voluntarily choose whether to synchronously tag on the bullet-screen comment in the video platform to the game client computing device for display. If the first player chooses to synchronously tag on the bullet-screen comment in the video platform to the game client computing device for display, the first player may obtain a game item reward after completely viewing the game plot.

In this embodiment of this application, through game plot matching between the game client computing device and the video platform, a bullet-screen comment of the video platform may be synchronously displayed in the game client computing device in a floating state in a tag-on manner by using a behavior node of a plot browsing operation as a reference. Through game plot matching between the game client computing device and the video platform, the player can be helped to transfer and share a bullet-screen comment in screen recording video content to a game interface of the game client computing device without any barriers.

Further, target bullet-screen comment content that is in the target bullet-screen comment information and that obtains a relatively large quantity of likes may be displayed in the current game picture of the game client computing device by using a customized bullet-screen comment special effect, such as highlighted or enlarged.

In an optional implementation of this embodiment, the bullet-screen comment information includes bullet-screen comment content and a bullet-screen comment position, and the target bullet-screen comment information may be synchronously displayed in the current game picture in the following specific implementation process:

obtaining target bullet-screen comment content and a target bullet-screen comment position from the target bullet-screen comment information;

determining a corresponding display position in the current game picture based on the target bullet-screen comment position; and displaying the target bullet-screen comment content at the display position.

It should be noted that the video platform may extract the bullet-screen comment content Bt and the bullet-screen comment position Bp in the video frame through OCR recognition, and combine the bullet-screen comment content Bt and the bullet-screen comment position Bp into bullet-screen comment information Map_B {Bt, Bp}. Therefore, the game client computing device may obtain the target bullet-screen comment information corresponding to the plot video frame from the video platform. The target bullet-screen comment information includes the target bullet-screen comment content and the target bullet-screen comment position. Therefore, the target bullet-screen comment information may be parsed to obtain the target bullet-screen comment content and the target bullet-screen comment position, the corresponding display position may be determined in the current game picture based on the target bullet-screen comment position, and the target bullet-screen comment content may be displayed at the display position.

In this embodiment of this application, the target bullet-screen comment content may be displayed at the corresponding position in the current game picture based on the target bullet-screen comment position, to synchronously move the bullet-screen comment information in the screen recording video in the video platform to the corresponding position in the game client computing device for display, thereby ensuring consistence between bullet-screen comment display effects of the game client computing device and the video platform, and improving viewing experience of the user.

In addition, the bullet-screen comment information may further include a content feature vector Bf of specific content of a plot advancement region in a video frame in which a bullet-screen comment is located, namely, specific identification content of the plot advancement region, for example, a feature vector corresponding to a specific button parameter (such as a shape, a size, or an interaction effect generated after clicking) of an OK button position and a feature vector corresponding to specific text content in a plot text region. That is, the video platform may perform, by using the SURF algorithm, recognition calculation on a position of the plot advancement region in the video frame in which the bullet-screen comment is located, to recognize the plot advancement region, and then recognize the specific content in the plot advancement region to determine the content feature vector Bf. For example, a content change in the plot advancement region and an interaction effect generated when a user clicks on the plot advancement region may be recognized by using the SURF algorithm.

It should be noted that, when a user uploads a screen recoding video to the video platform, the screen recording video may include an identifier of a plot advancement region, namely, an OK button position and a plot text region that are selected by the user. However, the user cannot mark the plot advancement region from a program code level and can only mark the plot advancement region by capturing an image from a video frame. Therefore, the identifier of the region selected by the user only helps narrow a recognition range of the SRUF algorithm. The SRUF algorithm does not need to perform recognition in the entire video frame, and the algorithm only needs to be applied to the region selected by the user to recognize and determine the plot advancement region.

In actual application, the video platform may combine the extracted content feature vector Bf, bullet-screen comment content Bt, and bullet-screen comment position Bp into bullet-screen comment information Map_B {Bf, Bt, Bp}. After the game client computing device determines the plot video frame that is in the screen recording video and that matches the current game picture, it indicates that the first player has unlocked the game plot progress corresponding to the plot video frame in the game client computing device. In this case, a content feature vector Bfi of specific content of the plot advancement region in the current game picture may be determined, and the content feature vector Bf carried in the bullet-screen comment information may be matched against the content feature vector Bfi corresponding to the current game picture. If the matching succeeds, it indicates that the specific content of the plot advancement region in the video frame in which the bullet-screen comment is located matches the specific content in the plot advancement region in the current game picture. In this case, the bullet-screen comment content Bt may be displayed at the bullet-screen comment position Bp, to synchronize the bullet-screen comment from the video platform to the game picture of the game client computing device.

It should be noted that after the game client computing device determines the plot video frame that is in the screen recording video and that matches the current game picture, when synchronizing the bullet-screen comment information in the plot video frame to the current game picture, the game client computing device may further determine whether the specific content in the plot advancement region in the plot video frame matches the specific content in the plot advancement region in the current game picture, to further check whether the plot advancement region in the plot video frame is the same as the plot advancement region in the current game picture, thereby avoiding mistakenly synchronizing the bullet-screen comment content to other game progress, and ensuring accuracy of bullet-screen comment synchronization.

In an optional implementation of this embodiment, the game client computing device may further divide the plot stage of the target game to mark chapter progress of the game plot, that is, the method may further include:
  dividing the plot stage into at least one plot chapter, and determining a plot advancement page in the at least one plot chapter; and
  for the plot advancement page, extracting a page feature vector of the plot advancement page, and storing a correspondence between the page feature vector and the plot chapter.

It should be noted that the plot stage of the target game usually may be divided into a plurality of plot chapters, and each plot chapter may include a page on which plot content is automatically played, or may include a plot advancement page. The plot advancement page is a page that requires a user to trigger an advancement event to perform advancement from the current plot chapter to a next plot chapter.

In actual application, the game client computing device may divide the plot stage into the at least one plot chapter $C_i$, and determine the plot advancement page in the at least one plot chapter; and for each plot advancement page, extract a page feature vector $T_{ai}$ of the plot advancement page, and store a correspondence between the page feature vector $T_{ai}$ and a plot chapter $C_i$, to facilitate subsequent determining of a plot chapter corresponding to the current game picture, to synchronize current plot chapter progress of the first player to the video platform.

In an optional implementation of this embodiment, in addition to playing the game in the game client computing device to advance game plot progress, the first player may also perform screen recording on a game picture of the target game and upload screen recording content to the video platform, for interaction between viewing users in game plot content, that is, the method may further include:
  when receiving a screen recording instruction, performing screen recording on a game picture of the target game to obtain a screen recording result; and
  setting a second plot advancement mark for the screen recording result to obtain a screen recording video, and uploading the screen recording video to the video platform.

It should be noted that the first player may trigger a screen recording control in the game client computing device to trigger the screen recording instruction, and when receiving the screen recording instruction, the game client computing device may perform screen recording on a game picture in a process of playing the target game, to obtain the screen recording result; and then set the second plot advancement mark for the screen recording result to obtain the screen recording video, and upload the screen recording video to the video platform.

In actual application, the first player may perform screen recording on a game picture of a currently ongoing plot chapter, or may perform screen recording on a game picture obtained after clearance.

In this embodiment of this application, the game client computing device may mark a video frame that is in the screen recording result and that can advance game plot progress, to obtain the screen recording video, and then upload the screen recording video to the video platform, to facilitate subsequent matching against only the video frame that can advance game plot progress during matching between the current game picture and the screen recording video, thereby saving computing resources, and improving efficiency of game plot progress matching.

In an optional implementation of this embodiment, the second plot advancement mark may be set for the screen recording result to obtain the screen recording video in the following specific implementation process:
  determining whether a corresponding setting marking template exists for the screen recording result; and
  when a corresponding setting marking template exists for the screen recording result, marking a plot advancement frame in the screen recording result and a plot advancement region in the plot advancement frame based on the setting marking template; or
  when no corresponding setting marking template exists for the screen recording result, receiving a marking operation of the player for the screen recording result, and marking a plot advancement frame in the screen recording result and a plot advancement region in the plot advancement frame based on the marking operation.

Specifically, the plot advancement frame is a video frame that can advance game plot progress of the target game, and the plot advancement region is a region in which the player performs an operation to trigger an advancement event to perform advancement from a current plot chapter to a next plot chapter. For example, the plot advancement region may include an OK button position and a plot text region.

In addition, the setting marking template is a marking template created by a player in a game client computing device for the screen recording video of the target game. The marking template may indicate a manner of marking the screen recording result, for example, a specific video frame that is in the screen recording result and that is a plot advancement frame, and a specific region that is in the plot advancement frame and in which an advancement event can be triggered to advance game plot progress.

It should be noted that after performing plot advancement marking on the screen recording video of the target game, a player A may create a marking template based on a marked plot advancement frame and plot advancement region in the plot advancement frame. Subsequently, when performing plot advancement marking on the screen recording video of the target game or performing plot advancement marking on a screen recording video of a game of the same type, another player B may directly use the marking template created by the player A, without manually performing plot advancement marking.

In actual application, when the second plot advancement mark is set for the screen recording result to obtain the screen recording video, it may be first determined whether a corresponding setting marking template exists for the screen recording result. When a corresponding setting marking template exists for the screen recording result, it indicates that another player has performed plot advancement marking on the screen recording result (or a screen recording result of the same type), and the setting marking template may include an identifier of the plot advancement frame and an identifier of the plot advancement region in the plot advancement frame, so that the plot advancement frame in the screen recording result and the plot advancement region in the plot advancement frame can be directly marked based on the setting marking template. During specific implementation, when the second plot advancement mark is set for the screen recording result by applying the setting marking template, the player may be further consulted first. After the player agrees, the setting marking template is applied. If the player disagrees, the player may perform manual marking.

When no corresponding setting marking template exists for the screen recording result, it indicates that the first player performs plot advancement marking on the screen recording result (or a screen recording result of the same type) for the first time. In this case, the first player needs to perform manual marking, that is, the marking operation of the player for the screen recording result is received, and the plot advancement frame in the screen recording result and the plot advancement region in the plot advancement frame are marked based on the marking operation.

In addition, after marking the plot advancement frame in the screen recording result and the plot advancement region in the plot advancement frame based on the marking operation, the game client computing device may further prompt the first player that the first player can create a marking template, where the marking template may be selected for application when another user uploading a screen recording video of the same game performs marking. That is, a corresponding marking template may be further created based on the marking operation for subsequent use by another player. Furthermore, a point reward may be provided for a player creating a marking template, and a playback volume of a screen recording video generated by using the marking template may be partially added to a playback volume of a screen recording video uploaded by the player creating the marking template.

In this embodiment of this application, when the second plot advancement mark is set for the screen recording result to obtain the screen recording video, it may be first determined whether a corresponding setting marking template exists. If a corresponding setting marking template exists, the setting marking template may be directly applied to perform plot advancement marking. If no corresponding setting marking template exists, manual marking may be performed. Therefore, a plurality of marking manners are provided, and marking efficiency of setting the second plot advancement mark for the screen recording result can be improved.

In an optional implementation of this embodiment, a correspondence between the plot advancement page and the plot chapter in the screen recording video may be further determined, that is, after the second plot advancement mark is set for the screen recording result to obtain the screen recording video, the method may further include:

determining at least one video frame that is in the screen recording video and in which the second plot advancement mark exists;
determining a matching relationship between the page feature vector of the plot advancement page and the at least one video frame; and
determining a plot chapter corresponding to the at least one video frame based on the matching relationship and the correspondence between the page feature vector and the plot chapter, and storing a correspondence between the video frame and the plot chapter.

It should be noted that the video platform subsequently positions game plot progress based on video frames of the screen recording video, while the game client computing device divides the plot stage and stores the correspondence between the page feature vector of the plot advancement page and the plot chapter. Therefore, the page feature vector needs to be matched against frame feature vectors of the video frames to determine correspondences between the video frames and the page feature vector; and then correspondences between the video frames and plot chapters need to be determined based on correspondences between the page feature vector and the plot chapters, and the correspondences between the video frames and the plot chapters need to be stored, to facilitate subsequent positioning of current game plot progress.

Correspondingly, the game client computing device may search the correspondences between the video frames and the plot chapters for the target plot chapter corresponding to the plot video frame, and then send the video permission unlocking instruction of the first player to the video platform, to notify the video platform to update the video permission information of the first player.

According to the game plot interaction method provided in this embodiment of this application, when the first player plays the game in the game client computing device, if the game client computing device detects that the first player enters the plot stage of the target game, the game client computing device may obtain the current game picture of the first player at intervals of the preset duration; then determine, in the screen recording video corresponding to the target game, the plot video frame corresponding to the current game picture, where the plot video frame may represent current plot progress of the first player; and then synchronize bullet-screen comments sent by other users for the plot video frame in the video platform to the current game picture in the game client computing device for display, that is, synchronize bullet-screen comment information corresponding to the current plot progress to a picture of corresponding game progress in the game client computing device for display.

In this way, bullet-screen comment synchronization can be performed on current game progress of the first player through game plot matching between the game client computing device and the video platform, to transfer and share a bullet-screen comment of corresponding progress in the screen recording video to a current game interface in the game client computing device without any barriers. Therefore, when playing the game in the game client computing device, the first player can view, in a timely manner, a bullet-screen comment sent by another user, to improve interaction timeliness, thereby improving interaction experience of a user for a game plot.

Figure 2:
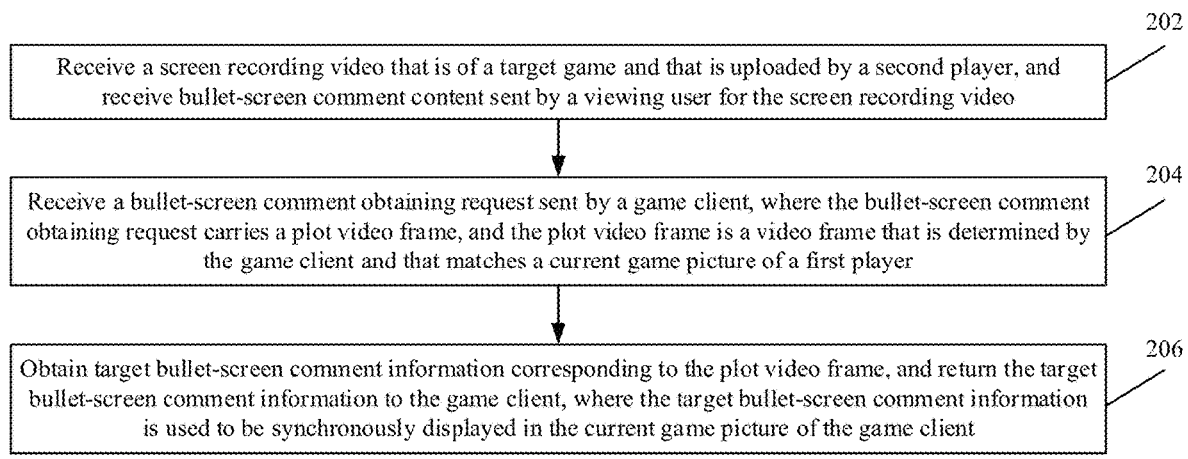
FIG. 2 is a flowchart of another game plot interaction method according to an embodiment of this application.

FIG. 2 is a flowchart of another game plot interaction method according to an embodiment of this application. The method is applied to a video platform. The video platform is a server computing device including a screen recording video related to a game plot. The server computing device may collect bullet-screen comment data of video playback client computing devices, and send the bullet-screen comment data to a game server computing device. The bullet-screen comment data is finally displayed in a game client computing device of a game player. The method may specifically include the following steps.

Step 202: Receive a screen recording video that is of a target game and that is uploaded by a second player, and receive bullet-screen comment content sent by a viewing user for the screen recording video.

Specifically, the second player is a player uploading the screen recording video of the target game to the video platform, and the second player may be the same as a first player, or may be different from the first player.

It should be noted that the second player may perform screen recording on the target game, and upload an obtained screen recording video to the video platform. The video platform may push the screen recording video to viewing users having video permission for viewing, that is, game plot progress of the viewing users in game client computing devices determines video play progress that the viewing users can view in the video platform.

In actual application, when viewing the screen recording video of the target game, the viewing users may send bullet-screen comment content to perform interaction on a game plot of the target game. In this case, the video platform may receive the bullet-screen comment content sent by the viewing users for the screen recording video, and synchronize the bullet-screen comment content to the viewing users for viewing, and may further synchronize the bullet-screen comment content to a game picture of corresponding game plot progress in a game client computing device.

In an optional implementation of this embodiment, the video platform may receive a video permission unlocking instruction synchronized by the game client computing device, to update video permission of a corresponding player, that is, after the screen recording video that is of the target game and that is uploaded by the second player is received, the method may further include:

receiving a video permission unlocking instruction sent by the game client computing device, where the video permission unlocking instruction carries player information of the first player and a target plot chapter;

obtaining the player information of the first player and the target plot chapter in the video permission unlocking instruction; and updating plot progress of the first player based on the player information and the target plot chapter.

It should be noted that when the game client computing device determines a plot video frame that is in the screen recording video and that matches a current game picture, it indicates that the first player has unlocked game plot progress corresponding to the plot video frame in the game client computing device, and the first player can have permission to view video content in front of the plot video frame in the video platform. Therefore, the game client computing device may determine the target plot chapter corresponding to the plot video frame based on a correspondence between video frames and plot chapters, and send the video permission unlocking instruction of the first user to the video platform. After receiving the video permission unlocking instruction, the video platform may obtain the player information of the first player and the target plot chapter in the video permission unlocking instruction, and update plot progress of the first player based on the player information and the target plot chapter, that is, the video platform may update video permission information of the first player.

In an optional implementation of this embodiment, when receiving a viewing request of a user, the video platform may check video permission of the requesting user to determine content that is of the screen recording video and that the requesting user can view, that is, after receiving the screen recording video that is of the target game and that is uploaded by the second player, the method may further include:

receiving a viewing request for the screen recording video, where the viewing request carries user information of a requesting user;

determining target plot progress of the requesting user based on the user information; and returning video data of the screen recording video to the requesting user based on the target plot progress.

It should be noted that when receiving the viewing request of the user, the video platform may check video permission of the requesting user to determine content that is of the screen recording video that the requesting user can view, that is, receive the viewing request for the screen recording video, determine the target plot progress of the requesting user based on the user information of the requesting user, and return the video data of the screen recording video to the requesting user based on the target plot progress.

In this embodiment of this application, the video platform may return, to the requesting user, video data that is in the screen recording video of the target game and that is in front of target plot progress that game plot progress of the requesting user in the game client computing device reaches, for the requesting user to view. That is, only a requesting user reaching corresponding plot progress in the game client computing device can view corresponding screen recording content. In this way, plot progress of the player in the game client computing device may be recorded in the video platform. When the video platform determines that the player has unlocked a plot in the game client computing device, a corresponding plot video uploaded to the video platform is open to the player, thereby providing a game plot interaction platform, and also avoiding a risk of game plot spoiler caused by uploading of a screen recording video.

In an optional implementation of this embodiment, after the video platform receives the screen recording video that is of the target game and that is uploaded by the second player, the method further includes:

determining a plot advancement frame in the screen recording video and a plot advancement region in the plot advancement frame; and extracting a frame vector of the plot advancement frame.

It should be noted that the player may upload the screen recording video of the target game to the video platform. The plot advancement frame and the plot advancement region in the plot advancement frame are marked in the screen recording video. Therefore, the video platform can recognize the plot advancement frame in the screen recording video and the plot advancement region (an OK button Tp and a plot text region Re) in the plot advancement frame, and extract the frame vector Tv of the plot advancement frame.

The plot advancement region (the OK button Tp and the plot text region Re) may be recognized by the second player (a user uploading the video) through selection, so that a recognition range of a SURF recognition algorithm used during subsequent synchronization of bullet-screen comment information can be narrowed, thereby improving recognition efficiency.

Step 204: Receive a bullet-screen comment obtaining request sent by the game client computing device, where the bullet-screen comment obtaining request carries the plot video frame, and the plot video frame is a video frame that is determined by the game client computing device and that matches the current game picture of the first player.

Step 206: Obtain target bullet-screen comment information corresponding to the plot video frame, and return the target bullet-screen comment information to the game client computing device, where the target bullet-screen comment information is used to be synchronously displayed in the current game picture of the game client computing device.

In an optional implementation of this embodiment, the obtaining target bullet-screen comment information corresponding to the plot video frame includes:

extracting bullet-screen comment content and a bullet-screen comment position in the plot video frame, and obtaining a frame feature vector of the plot video frame; and combining the frame feature vector of the plot video frame, the bullet-screen comment content, and the bullet-screen comment position into the target bullet-screen comment information corresponding to the plot video frame.

According to the game plot interaction method provided in this embodiment of this application, the video platform may receive the screen recording video that is of the target game and that is uploaded by the second player, and receive the bullet-screen comment information sent by the viewing user for the screen recording video; receive the bullet-screen comment obtaining request sent by the game client computing device, where the bullet-screen comment obtaining request carries the plot video frame, and the plot video frame is a video frame that is determined by the game client computing device and that matches the current game picture of the first player; and obtain the target bullet-screen comment information corresponding to the plot video frame, and return the target bullet-screen comment information to the game client computing device, where the target bullet-screen comment information is used to be synchronously displayed in the current game picture of the game client computing device. In this case, when current plot progress of the player in the game client computing device is the plot video frame, bullet-screen comments sent by other users for the plot video frame in the video platform may be synchronized to the current game picture in the game client computing device for display, that is, bullet-screen comment information corresponding to the current plot progress may be synchronized to a picture of corresponding game progress in the game client computing device for display.

In this way, bullet-screen comment synchronization can be performed on current game progress of the first player through game plot matching between the game client computing device and the video platform, to transfer and share a bullet-screen comment of corresponding progress in the screen recording video to a current game interface in the game client computing device without any barriers. Therefore, when playing the game in the game client computing device, the first player can view, in a timely manner, a bullet-screen comment sent by another user, to improve interaction timeliness, thereby improving interaction experience of a user for a game plot.

Figure 3:
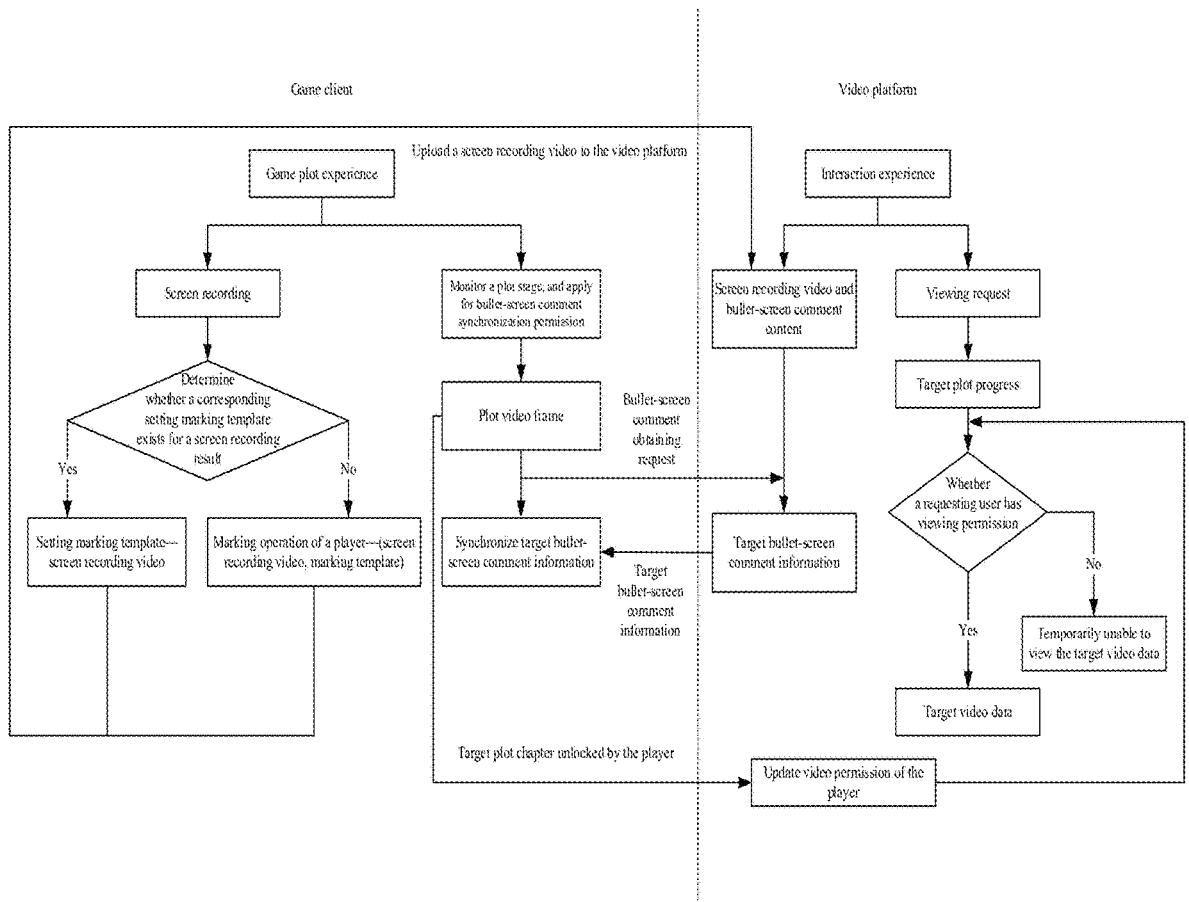
FIG. 3 is a schematic diagram of game plot interaction according to an embodiment of this application.

FIG. 3 is a schematic diagram of game plot interaction according to an embodiment of this application. As shown in FIG. 3, the method specifically includes the following steps.

Step 1: A game client computing device provides game plot experience for a player.

It should be noted that the following step 2 to step 4 are an interaction process in which the player performs screen recording on a target game in the game client computing device and uploads a screen recording video to a video platform.

Step 2: The player may perform screen recording on the target game in the game client computing device to obtain a screen recording result.

Step 3: The game client computing device determines whether a corresponding setting marking template exists for the screen recording result; and if yes, marks the screen recording result based on the setting marking template to obtain a screen recording video of the target game; or if no, marks the screen recording result based on a marking operation of the player to obtain a screen recording video of the target game, and creates a marking template corresponding to the screen recording result.

Step 4: The game client computing device uploads the screen recording video to the video platform.

It should be noted that the following step 5 to step 8 are an interaction process in which the player performs the target game in the game client computing device and the game client computing device synchronizes bullet-screen comment information in the video platform.

Step 5: The game client computing device monitors that the player enters a plot stage of the target game, and applies for bullet-screen comment synchronization permission.

Step 6: The game client computing device obtains a current game picture of the player at intervals of preset duration, obtains a screen recording video corresponding to the target game, and determines a plot video frame that is in the screen recording video and that matches the current game picture.

Step 7: The game client computing device obtains target bullet-screen comment information corresponding to the plot video frame from the video platform, and synchronously displays the target bullet-screen comment information in the current game picture.

Step 8: The game client computing device synchronizes a target plot chapter unlocked by the player to the video platform based on the plot video frame, so that the video platform updates video permission of the player.

Step 9: The video platform provides interaction experience of the screen recording video of the target game.

It should be noted that the following step 10 and step 11 are an interaction process in which the video platform synchronizes the bullet-screen comment information to the game client computing device.

Step 10: The video platform receives the screen recording video that is of the target game and that is uploaded by the player, and receives bullet-screen comment content sent by a viewing user for the screen recording video.

Step 11: The video platform receives a bullet-screen comment obtaining request sent by the game client computing device, where the bullet-screen comment obtaining request carries a plot progress identifier; and obtains the target bullet-screen comment information corresponding to the plot progress identifier, and returns the target bullet-screen comment information to the game client computing device for synchronous display.

It should be noted that the following step 12 and step 13 are a process in which the video platform checks video viewing permission of a requesting user.

Step 12: The video platform receives a viewing request for the screen recording video, where the viewing request carries user information of the requesting user; and determines, based on the user information, video permission corresponding to target plot progress of the requesting user, where the video permission may be updated based on the unlocked target plot chapter synchronized by the game client computing device.

Step 13: The video platform determines, based on the video permission of the requesting user, whether the requesting user has viewing permission of target video data of the screen recording video; and if yes, returns the target video data of the screen recording video to the requesting user; or if no, reminders the requesting user that the requesting user has not reached target plot progress and is temporarily incapable of viewing the target video data of the screen recording video.

According to the game plot interaction method provided in this embodiment of this application, the game client computing device may be connected to an interface of the video platform to recognize plot browsing behavior and browsing progress, such as automatic play and clicking on a next sentence, of the player in the game client computing device. In addition, a video uploading template is provided for the connected video platform. When the player performs screen recording on a plot and uploads a screen recording video to the video platform, touch behavior and a text change within a specific range in a game picture may be recognized to determine play progress in the screen recording video, to synchronize plot game progress in the game client computing device with the video play progress in the video platform. When a user leaves a bullet-screen comment in the uploaded video, the game player may voluntarily choose, when browsing a plot in the game client computing device, whether to synchronically tag on the bullet-screen comment in the video platform to the game client computing device. In addition, plot progress of the player in the game client computing device may be recorded in the video platform. When the video platform determines that the player has unlocked a plot, a corresponding plot video uploaded to the video platform is open to the player, thereby providing a game plot interaction platform, and also avoiding a risk of game plot spoiler caused by uploading of a screen recording video.

In addition, through game plot matching between the game client computing device and the video platform, the bullet-screen comment of the video platform may be further synchronously displayed in the game client computing device in a floating state in a tag-on manner by using a behavior node of a plot browsing operation as a reference. Through game plot matching between the game client computing device and the video platform, the player can be helped to transfer and share a bullet-screen comment in screen recording video content to a game interface of the game client computing device without any barriers. In addition, a player having started this plot in the game can be provided with screen recording viewing and bullet-screen comment communication permission in the video platform, to effectively avoid spoilers.

Figure 4:
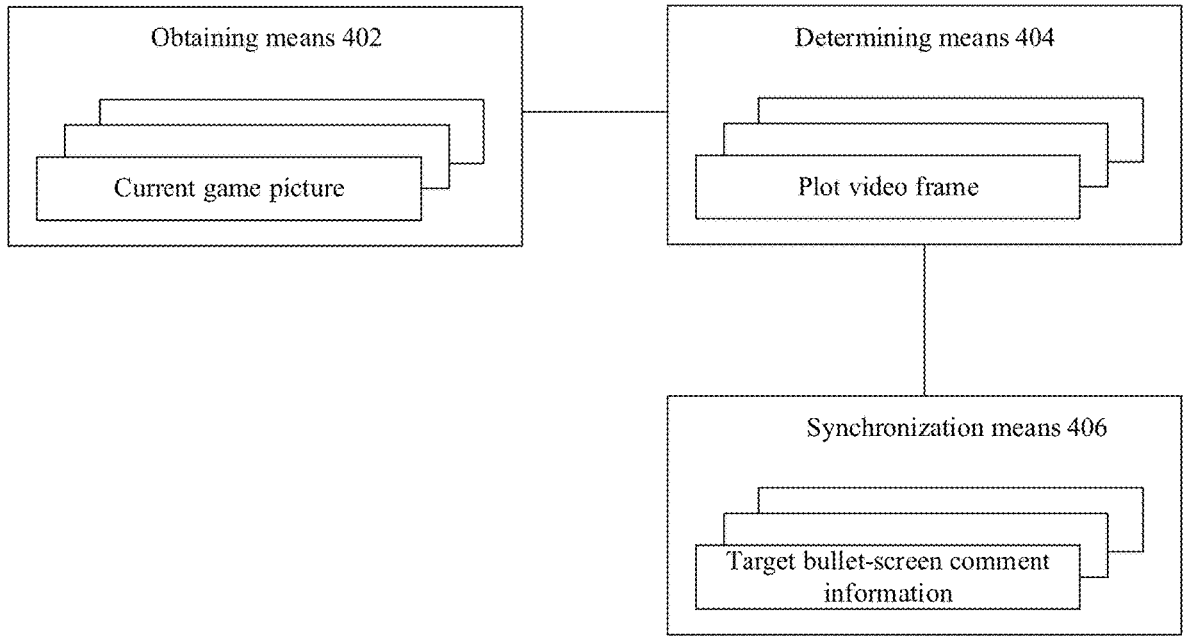
FIG. 4 is a schematic diagram of a structure of a game plot interaction apparatus according to an embodiment of this application.

Corresponding to the foregoing method embodiment, this application further provides a game plot interaction apparatus embodiment. FIG. 4 is a schematic diagram of a structure of a game plot interaction apparatus according to an embodiment of this application. The apparatus is applied to a game client computing device. As shown in FIG. 4, the apparatus includes:

an obtaining means 402, configured to: when it is detected that a first player enters a plot stage of a target game, obtain a current game picture of the first player at intervals of preset duration;

a determining means 404, configured to obtain a screen recording video corresponding to the target game, and determine a plot video frame that is in the screen recording video and that matches the current game picture; and a synchronization means 406, configured to obtain target bullet-screen comment information corresponding to the plot video frame from a video platform, and synchronously display the target bullet-screen comment information in the current game picture.

Optionally, the determining means 404 is further configured to:
determine at least one progress key frame that is in the screen recording video and in which a first plot advancement mark exists;
match the current game picture against the at least one progress key frame to determine a matching key frame corresponding to the current game picture; and
determine, based on the matching key frame, the plot video frame that is in the screen recording video and that matches the current game picture.

Optionally, the determining means 404 is further configured to:
recognize and monitor a plot advancement region in the current game picture; and
when monitoring that an advancement event occurs in the plot advancement region, use the matching key frame as the plot video frame matching the current game picture.

Optionally, the bullet-screen comment information includes bullet-screen comment content and a bullet-screen comment position; and the synchronization means 406 is further configured to:
obtain target bullet-screen comment content and a target bullet-screen comment position from the target bullet-screen comment information;
determine a corresponding display position in the current game picture based on the target bullet-screen comment position; and
display the target bullet-screen comment content at the display position.

Optionally, the apparatus further includes a sending means, configured to:
determine a target plot chapter corresponding to the plot video frame based on a correspondence between video frames and plot chapters; and
send a video permission unlocking instruction of the first player to the video platform, where the video permission unlocking instruction carries player information of the first player and the target plot chapter.

Optionally, the apparatus further includes a division means, configured to:
divide the plot stage into at least one plot chapter, and determine a plot advancement page in the at least one plot chapter; and
for the plot advancement page, extract a page feature vector of the plot advancement page, and store a correspondence between the page feature vector and the plot chapter.

Optionally, the apparatus further includes an uploading means, configured to:
when receiving a screen recording instruction, perform screen recording on a game picture of the target game to obtain a screen recording result; and
set a second plot advancement mark for the screen recording result to obtain a screen recording video, and upload the screen recording video to the video platform.

Optionally, the uploading means is further configured to:
determine whether a corresponding setting marking template exists for the screen recording result; and
when a corresponding setting marking template exists for the screen recording result, mark a plot advancement frame in the screen recording result and a plot advancement region in the plot advancement frame based on the setting marking template; or when no corresponding setting marking template exists for the screen recording result, receive a marking operation of the player for the screen recording result, and mark a plot advancement frame in the screen recording result and a plot advancement region in the plot advancement frame based on the marking operation.

Optionally, the uploading means is further configured to:

determine at least one video frame that is in the screen recording video and in which the second plot advancement mark exists;

determine a matching relationship between the page feature vector of the plot advancement page and the at least one video frame; and determining a plot chapter corresponding to the at least one video frame based on the matching relationship and the correspondence between the page feature vector and the plot chapter, and storing a correspondence between the video frame and the plot chapter.

According to the game plot interaction apparatus provided in this embodiment of this application, when the first player plays the game in the game client computing device, if the game client computing device detects that the first player enters the plot stage of the target game, the game client computing device may obtain the current game picture of the first player at intervals of the preset duration; then determine, in the screen recording video corresponding to the target game, the plot video frame corresponding to the current game picture, where the plot video frame may represent current plot progress of the first player; and then synchronize bullet-screen comments sent by other users for the plot video frame in the video platform to the current game picture in the game client computing device for display, that is, synchronize bullet-screen comment information corresponding to the current plot progress to a picture of corresponding game progress in the game client computing device for display.

In this way, bullet-screen comment synchronization can be performed on current game progress of the first player through game plot matching between the game client computing device and the video platform, to transfer and share a bullet-screen comment of corresponding progress in the screen recording video to a current game interface in the game client computing device without any barriers. Therefore, when playing the game in the game client computing device, the first player can view, in a timely manner, a bullet-screen comment sent by another user, to improve interaction timeliness, thereby improving interaction experience of a user for a game plot.

Figure 5:
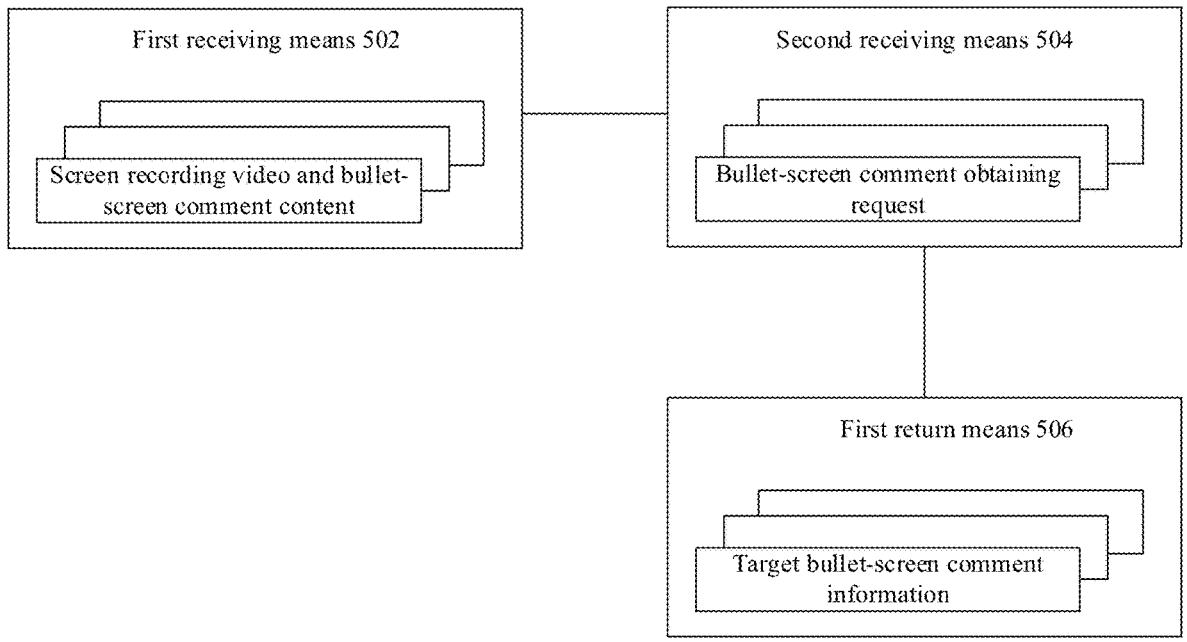
FIG. 5 is a schematic diagram of a structure of another game plot interaction apparatus according to an embodiment of this application.

Corresponding to the foregoing method embodiment, this application further provides another game plot interaction apparatus embodiment. FIG. 5 is a schematic diagram of a structure of another game plot interaction apparatus according to an embodiment of this application. The apparatus is applied to a game client computing device. As shown in FIG. 5, the apparatus includes:

a first receiving means 502, configured to receive a screen recording video that is of a target game and that is uploaded by a second player, and receive bullet-screen comment content sent by a viewing user for the screen recording video;

a second receiving means 504, configured to receive a bullet-screen comment obtaining request sent by a game client computing device, where the bullet-screen comment obtaining request carries a plot video frame, and the plot video frame is a video frame that is determined by the game client computing device and that matches a current game picture of a first player; and a first return means 506, configured to obtain target bullet-screen comment information corresponding to the plot video frame, and return the target bullet-screen comment information to the game client computing device, where the target bullet-screen comment information is used to be synchronously displayed in the current game picture of the game client computing device.

Optionally, the apparatus further includes an updating means, configured to:

receive a video permission unlocking instruction sent by the game client computing device, where the video permission unlocking instruction carries player information of the first player and a target plot chapter;

obtain the player information of the first player and the target plot chapter in the video permission unlocking instruction; and update plot progress of the first player based on the player information and the target plot chapter.

Optionally, the apparatus further includes a second return means, configured to:

receive a viewing request for the screen recording video, where the viewing request carries user information of a requesting user;

determine target plot progress of the requesting user based on the user information; and return video data of the screen recording video to the requesting user based on the target plot progress.

Optionally, the first return means 506 is further configured to:

extract bullet-screen comment content and a bullet-screen comment position in the plot video frame, and obtain a frame feature vector of the plot video frame; and combine the frame feature vector of the plot video frame, the bullet-screen comment content, and the bullet-screen comment position into the target bullet-screen comment information corresponding to the plot video frame.

Optionally, the apparatus further includes an extraction means, configured to:

determine a plot advancement frame in the screen recording video and a plot advancement region in the plot advancement frame; and extract a frame vector of the plot advancement frame.

According to the game plot interaction apparatus provided in this embodiment of this application, the video platform may receive the screen recording video that is of the target game and that is uploaded by the second player, and receive the bullet-screen comment information sent by the viewing user for the screen recording video; receive the bullet-screen comment obtaining request sent by the game client computing device, where the bullet-screen comment obtaining request carries the plot video frame, and the plot video frame is a video frame that is determined by the game client computing device and that matches the current game picture of the first player; and obtain the target bullet-screen comment information corresponding to the plot video frame, and return the target bullet-screen comment information to the game client computing device, where the target bullet-screen comment information is used to be synchronously displayed in the current game picture of the game client computing device. In this case, when current plot progress of the player in the game client computing device is the plot video frame, bullet-screen comments sent by other users for the plot video frame in the video platform may be synchronized to the current game picture in the game client computing device for display, that is, bullet-screen comment information corresponding to the current plot progress may be synchronized to a picture of corresponding game progress in the game client computing device for display.

In this way, bullet-screen comment synchronization can be performed on current game progress of the first player through game plot matching between the game client computing device and the video platform, to transfer and share a bullet-screen comment of corresponding progress in the screen recording video to a current game interface in the game client computing device without any barriers. Therefore, when playing the game in the game client computing device, the first player can view, in a timely manner, a bullet-screen comment sent by another user, to improve interaction timeliness, thereby improving interaction experience of a user for a game plot.

The schematic solutions of the game plot interaction apparatuses in the embodiments are described above. It should be noted that the technical solutions of the game plot interaction apparatuses and the technical solutions of the foregoing game plot interaction methods belong to the same concept. For details not described in detail in the technical solutions of the game plot interaction apparatuses, refer to the descriptions of the technical solutions of the foregoing game plot interaction methods.

Figure 6:
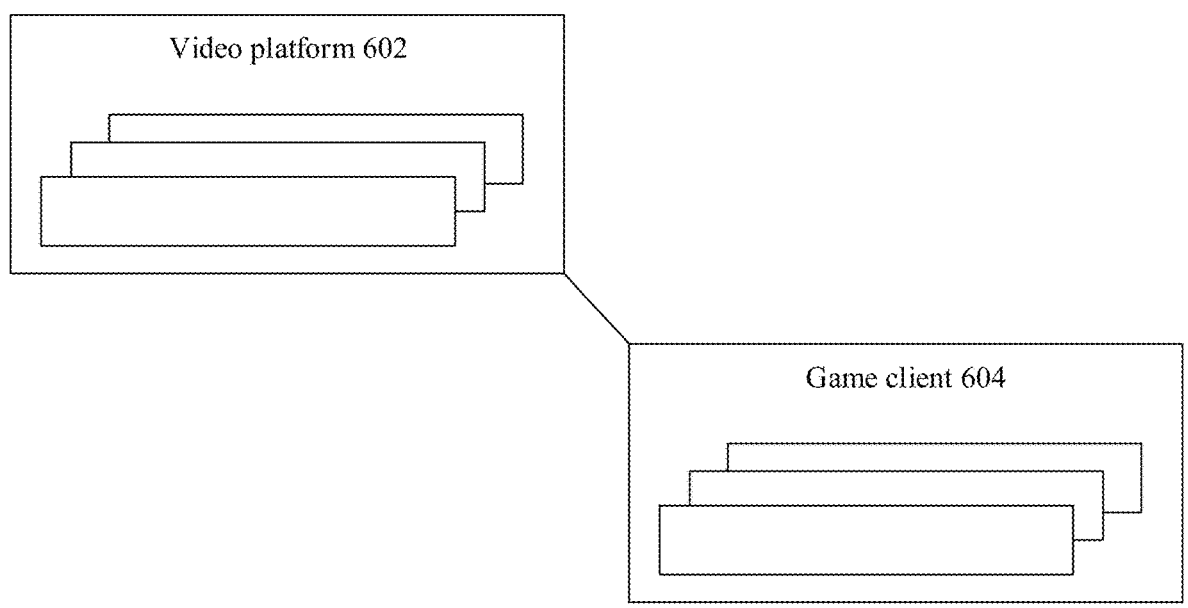
FIG. 6 is a schematic diagram of a structure of a game plot interaction system according to an embodiment of this application.

Corresponding to the foregoing method embodiments, this application further provides a game plot interaction system embodiment. FIG. 6 is a schematic diagram of a structure of a game plot interaction system according to an embodiment of this application. As shown in FIG. 6, the system includes a video platform 602 and a game client computing device 604.

The video platform 602 is configured to receive a screen recording video that is of a target game and that is uploaded by a second player, and receive bullet-screen comment content sent by a viewing user for the screen recording video; receive a bullet-screen comment obtaining request sent by the game client computing device, where the bullet-screen comment obtaining request carries a plot video frame, and the plot video frame is a video frame that is determined by the game client computing device and that matches a current game picture of a first player; and obtain target bullet-screen comment information corresponding to the plot video frame, and return the target bullet-screen comment information to the game client computing device, where the target bullet-screen comment information is used to be synchronously displayed in the current game picture of the game client computing device.

The game client computing device 604 is configured to: when detecting that the first player enters a plot stage of the target game, obtain the current game picture of the first player at intervals of preset duration; obtain the screen recording video corresponding to the target game, and determine the plot video frame that is in the screen recording video and that matches the current game picture; and obtain the target bullet-screen comment information corresponding to the plot video frame from the video platform, and synchronously display the target bullet-screen comment information in the current game picture.

According to the game plot interaction system provided in this embodiment of this application, when the first player plays the game in the game client computing device, if the game client computing device detects that the first player enters the plot stage of the target game, the game client computing device may obtain the current game picture of the first player at intervals of the preset duration; then determine, in the screen recording video corresponding to the target game, the plot video frame corresponding to the current game picture, where the plot video frame may represent current plot progress of the first player; and then synchronize bullet-screen comments sent by other users for the plot video frame in the video platform to the current game picture in the game client computing device for display, that is, synchronize bullet-screen comment information corresponding to the current plot progress to a picture of corresponding game progress in the game client computing device for display.

In this way, bullet-screen comment synchronization can be performed on current game progress of the first player through game plot matching between the game client computing device and the video platform, to transfer and share a bullet-screen comment of corresponding progress in the screen recording video to a current game interface in the game client computing device without any barriers. Therefore, when playing the game in the game client computing device, the first player can view, in a timely manner, a bullet-screen comment sent by another user, to improve interaction timeliness, thereby improving interaction experience of a user for a game plot.

The schematic solutions of the game plot interaction system in the embodiments are described above. It should be noted that the technical solutions of the game plot interaction system and the technical solutions of the foregoing game plot interaction methods belong to the same concept. For details not described in detail in the technical solutions of the game plot interaction system, refer to the descriptions of the technical solutions of the foregoing game plot interaction methods.

Figure 7:
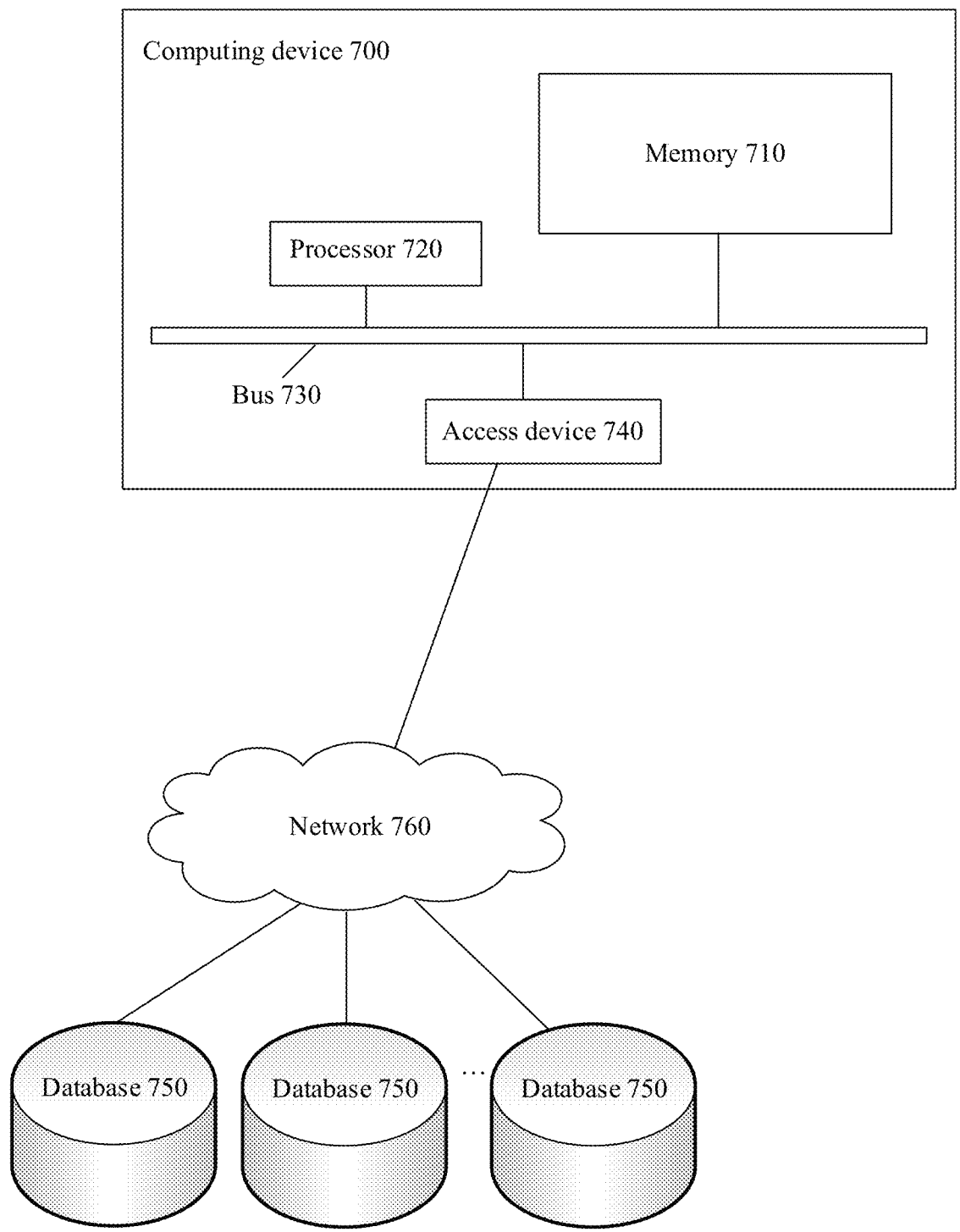
FIG. 7 is a block diagram of a structure of a computing device according to an embodiment of this application.

FIG. 7 is a block diagram of a structure of a computing device according to an embodiment of this application. Components of the computing device 700 include but are not limited to a memory 710 and a processor 720. The processor 720 is connected to the memory 710 by using a bus 730. A database 750 is configured to store data.

The computing device 700 further includes an access device 740. The access device 740 enables the computing device 700 to perform communication by using one or more networks 760. Examples of these networks include a public switched telephone network (PSTN), a local area network (LAN), a wide area network (WAN), a personal area network (PAN), or a combination of communication networks such as the Internet. The access device 740 may include one or more of any types of wired or wireless network interfaces (for example, a network interface controller (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 700 and other components not shown in FIG. 7 may be connected to each other, for example, by using a bus. It should be understood that the block diagram of the structure of the computing device shown in FIG. 7 is merely used as an example instead of a limitation on the scope of this application. A person skilled in the art can add or replace other components as required.

The computing device 700 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or another type of mobile device, or a stationary computing device such as a desktop computer or a PC. The computing device 700 may be alternatively a mobile or stationary server computing device.

The processor 720 is configured to execute computer executable instructions to implement the steps of the foregoing game plot interaction methods.

The schematic solutions of the computing device in the embodiments are described above. It should be noted that the technical solutions of the computing device and the technical solutions of the foregoing game plot interaction methods belong to the same concept. For details not described in detail in the technical solutions of the computing device, refer to the descriptions of the technical solutions of the foregoing game plot interaction methods.

An embodiment of this application further provides a computer-readable storage medium. The computer-readable storage medium stores computer executable instructions, and the steps of the foregoing game plot interaction methods are implemented when the computer executable instructions are executed by a processor.

The schematic solutions of the computer-readable storage medium in the embodiments are described above. It should be noted that the technical solutions of the storage medium and the technical solutions of the foregoing game plot interaction methods belong to the same concept. For details not described in detail in the technical solutions of the storage medium, refer to the descriptions of the technical solutions of the foregoing game plot interaction methods.

Specific embodiments of this specification are described above. Other embodiments fall within the scope of the appended claims. In some cases, actions or steps described in the claims may be performed in an order different from that in the embodiments and desired results may still be achieved. In addition, processes described in the accompanying drawings do not necessarily require shown specific orders or sequences to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include any entity or apparatus capable of carrying computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like.

It should be noted that, for brief description, the foregoing method embodiments are represented as a combination of a series of actions. However, a person skilled in the art should be aware that this application is not limited to the described order of the actions, because some steps may be performed in other orders or simultaneously according to this application. In addition, a person skilled in the art should also be aware that the embodiments described in this specification are all example embodiments, and used actions and modules are not necessarily mandatory to this application.

In the foregoing embodiments, the descriptions of the embodiments have respective focuses. For a part that is not described in detail in a specific embodiment, refer to related descriptions in other embodiments.

The example embodiments of this application disclosed above are merely intended to help describe this application. In the optional embodiments, not all details are described in detail, and the present invention is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof

What is claimed is:

1. A method, applied to a client device, and the method comprising:
   capturing a current game picture on a first client device at intervals of a preset duration in response to detecting that a first player enters a plot stage of a target game, the first client device associated with the first player;
   obtaining a screen recording video corresponding to the target game from a video platform, wherein the video platform comprises a server computing device configured to receive the screen recording video from at least one second client device associated with at least one second player and configured to receive comments associated with the screen recording video from viewing users;
   determining a plot video frame that is in the screen recording video and that matches the current game picture;
   obtaining target bullet-screen comment information corresponding to the plot video frame from the video platform; and
   synchronously displaying target bullet screens in the current game picture on the first client device, wherein the target bullet screens correspond to the target bullet-screen comment information.

2. The method according to claim 1, wherein the determining a plot video frame that is in the screen recording video and that matches the current game picture further comprises:
   determining at least one key frame in the screen recording video, wherein the at least one key frame is associated with a first mark indicative of a plot advancement in the target game;
   matching the current game picture against the at least one key frame to determine a matching key frame corresponding to the current game picture; and
   determining the plot video frame that is in the screen recording video and that matches the current game picture based on the matching key frame.

3. The method according to claim 2, wherein the determining the plot video frame that is in the screen recording video and that matches the current game picture based on the matching key frame further comprises:
   recognizing and monitoring a plot advancement region in the current game picture, wherein the plot advancement region comprises one or more interface elements configured to be triggered by a player to advance a game plot; and
   in response to determining that an advancement event occurs in the plot advancement region based on user input, identifying the matching key frame as the plot video frame.

4. The method according to claim 1, wherein the target bullet-screen comment information comprises comment content and information indicative of bullet-screen comment positions of displaying the comment content, and wherein the synchronously displaying the target bullet-screen comment information in the current game picture on the first client device further comprises:

obtaining target bullet-screen comment content and target bullet-screen comment positions from the target bullet-screen comment information;

determining corresponding display positions in the current game picture based on the target bullet-screen comment positions; and displaying the target bullet-screen comment content at the corresponding display positions.

5. The method according to claim 1, after the determining a plot video frame that is in the screen recording video and that matches the current game picture, the method further comprising:

determining a target plot chapter corresponding to the plot video frame based on corresponding relationships between video frames and plot chapters; and sending an instruction of unlocking video for the first player to the video platform, wherein the instruction carries player information of the first player and information indicative of the target plot chapter.

6. The method according to claim 1, further comprising:

dividing the plot stage into plot chapters, and determining a plot advancement page in the plot chapters, wherein the plot advancement page is a page configured to trigger an advancement event based on user input so as to advance from a current plot chapter to a next plot chapter; and extracting a page feature vector of the plot advancement page, and storing information indicative of a corresponding relationship between the page feature vector and one of the plot chapters.

7. The method according to claim 1, further comprising:

in response to receiving a screen recording instruction, performing screen recording on the target game to obtain a screen recording result by the first client device; and setting a second mark indicative of a plot advancement for the screen recording result to obtain a second screen recording video, and uploading the second screen recording video to the video platform.

8. The method according to claim 7, wherein the setting a second mark indicative of a plot advancement for the screen recording result to obtain a second screen recording video further comprises:

determining whether there exists a corresponding template of setting a mark for the screen recording result;

in response to determining that there exists the corresponding template, marking a plot advancement frame in the screen recording result and a plot advancement region in the plot advancement frame based on the corresponding template; and in response to determining that no corresponding template exists, receiving a marking operation from the first player, and marking the plot advancement frame in the screen recording result and the plot advancement region in the plot advancement frame based on the marking operation.

9. The method according to claim 7, after the setting a second mark indicative of a plot advancement for the screen recording result to obtain a second screen recording video, the method further comprising:

determining at least one video frame that is in the second screen recording video and associated with the second mark;

determining a matching relationship between a page feature vector of the plot advancement page and the at least one video frame; and determining a plot chapter corresponding to the at least one video frame based on the matching relationship and a corresponding relationship between the page feature vector and the plot chapter, and storing a correspondence between the at least one video frame and the plot chapter.

10. A method, applied to a video platform, and the method comprising:

receiving a screen recording video that is of a target game and that is uploaded by a second client device associated with a second player, and receiving comments associated with the screen recording video from viewing users;

receiving a request for obtaining bullet-screen comment information from a first client device associated with a first player, wherein the request carries data indicative of a plot video frame, and wherein the plot video frame is a video frame that is determined by the first client device and that matches a current game picture of the target game on the first client device; and obtaining target bullet-screen comment information corresponding to the plot video frame, and transmitting the target bullet-screen comment information to the first client device for synchronous display of target bullet screens in the current game picture on the first client device, wherein the target bullet screens correspond to the target bullet-screen comment information.

11. The method according to claim 10, after the receiving a screen recording video that is of a target game and that is uploaded by a second client device associated with a second player, the method further comprising:

receiving an instruction of unlocking video to the first player from the first client device, wherein the instruction carries player information of the first player and information indicative of a target plot chapter;

obtaining the player information of the first player and the information indicative of the target plot chapter from the instruction; and updating a plot progress associated with the first player based on the player information and the target plot chapter.

12. The method according to claim 11, after the receiving a screen recording video that is of a target game and that is uploaded by a second client device associated with a second player, the method further comprising:

receiving a request for viewing the screen recording video, wherein the request carries user information of a requesting user;

determining a target plot progress associated with the requesting user based on the user information; and returning data of the screen recording video to the requesting user based on the target plot progress.

13. The method according to claim 10, wherein the obtaining target bullet-screen comment information corresponding to the plot video frame further comprises:

extracting bullet-screen comment content and information indicative of bullet-screen display positions associated with the plot video frame, and obtaining a frame feature vector of the plot video frame; and combining the frame feature vector of the plot video frame, the bullet-screen comment content, and the information indicative of bullet-screen display positions into the target bullet-screen comment information corresponding to the plot video frame.

14. The method according to claim 10, after the receiving a screen recording video that is of a target game and that is uploaded by a second client device associated with a second player, the method further comprising:
  determining a plot advancement frame in the screen recording video and a plot advancement region in the plot advancement frame; and
  extracting a frame vector of the plot advancement frame.

15. A computing device, comprising:
  at least one processor; and
  at least one memory communicatively coupled to the at least one processor and comprising computer-readable instructions that upon execution by the at least one processor cause the at least one processor to perform operations comprising:
  capturing a current game picture on a first client device at intervals of a preset duration in response to detecting that a first player enters a plot stage of a target game, the first client device associated with the first player;
  obtaining a screen recording video corresponding to the target game from a video platform, wherein the video platform comprises a server computing device configured to receive the screen recording video from at least one second client device associated with at least one second player and configured to receive comments associated with the screen recording video from viewing users;
  determining a plot video frame that is in the screen recording video and that matches the current game picture;
  obtaining target bullet-screen comment information corresponding to the plot video frame from the video platform; and
  synchronously displaying target bullet screens in the current game picture on the first client device, wherein the target bullet screens correspond to the target bullet-screen comment information.

16. The client computing device according to claim 15, wherein the determining a plot video frame that is in the screen recording video and that matches the current game picture further comprises:
  determining at least one key frame in the screen recording video, wherein the at least one key frame is associated with a first mark indicative of a plot advancement in the target game;
  matching the current game picture against the at least one key frame to determine a matching key frame corresponding to the current game picture; and
  determining the plot video frame that is in the screen recording video and that matches the current game picture based on the matching key frame.

17. The client computing device according to claim 16, wherein the determining the plot video frame that is in the screen recording video and that matches the current game picture based on the matching key frame further comprises:
  recognizing and monitoring a plot advancement region in the current game picture, wherein the plot advancement region comprises one or more interface elements configured to be triggered by a player to advance a game plot; and
  in response to determining that an advancement event occurs in the plot advancement region based on user input, identifying the matching key frame as the plot video frame.

18. The client computing device according to claim 15, after the determining a plot video frame that is in the screen recording video and that matches the current game picture, the operations further comprising:
  determining a target plot chapter corresponding to the plot video frame based on corresponding relationships between video frames and plot chapters; and
  sending an instruction of unlocking video for the first player to the video platform, wherein the instruction carries player information of the first player and information indicative of the target plot chapter.

19. The client computing device according to claim 15, the operations further comprising:
  dividing the plot stage into plot chapters, and determining a plot advancement page in the plot chapters, wherein the plot advancement page is a page configured to trigger an advancement event based on user input so as to advance from a current plot chapter to a next plot chapter; and
  extracting a page feature vector of the plot advancement page, and storing information indicative of a corresponding relationship between the page feature vector and one of the plot chapters.

20. The client computing device according to claim 15, the operations further comprising:
  in response to receiving a screen recording instruction, performing screen recording on the target game to obtain a screen recording result by the first client device; and
  setting a second mark indicative of a plot advancement for the screen recording result to obtain a second screen recording video, and uploading the second screen recording video to the video platform.

* * * * *